United States Patent
Stier

(10) Patent No.: US 8,452,887 B1
(45) Date of Patent: *May 28, 2013

(54) SYSTEM AND METHOD FOR MANAGING AND DISTRIBUTING AUDIO RECORDINGS

(75) Inventor: Jeffrey Stier, New York, NY (US)

(73) Assignee: Voice Portraits, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,396

(22) Filed: Sep. 19, 2011

Related U.S. Application Data

(63) Continuation of application No. 13/198,977, filed on Aug. 5, 2011.

(51) Int. Cl.
*G06F 15/16* (2006.01)

(52) U.S. Cl.
USPC ............ 709/231; 709/206; 715/716; 725/116

(58) Field of Classification Search
USPC .................. 709/206, 231; 715/716; 725/116
See application file for complete search history.

(56) References Cited

U.S. PATENT DOCUMENTS

| | | |
|---|---|---|
| 6,385,306 B1 | 5/2002 | Baxter, Jr. |
| 6,505,160 B1 | 1/2003 | Levy et al. |
| 6,609,105 B2 | 8/2003 | Van Zoest et al. |
| 6,804,806 B1 | 10/2004 | Bansal et al. |
| 7,181,468 B2 | 2/2007 | Spring et al. |
| 7,284,036 B2 | 10/2007 | Ramaswamy |
| 7,346,687 B2 | 3/2008 | Lipscomb et al. |
| 7,349,923 B2 | 3/2008 | Spring et al. |
| 7,370,063 B2 | 5/2008 | Vilcauskas et al. |
| 7,376,581 B2 | 5/2008 | DeRose et al. |
| 7,379,661 B2 | 5/2008 | Lamkin et al. |
| 7,478,059 B2 | 1/2009 | Crocitto |
| 7,647,128 B2 | 1/2010 | Jaffray et al. |
| 7,708,643 B2 | 5/2010 | Allard et al. |
| 7,752,202 B2 | 7/2010 | Kobori et al. |
| 7,788,271 B2 | 8/2010 | Soma et al. |
| 7,877,814 B2 | 1/2011 | Kawasaki |
| 7,900,818 B2 | 3/2011 | Espelien |
| RE42,548 E | 7/2011 | Kuriyama |
| 7,979,447 B2 | 7/2011 | DaCosta |
| 2001/0042048 A1 | 11/2001 | Boykin et al. |
| 2002/0116614 A1 | 8/2002 | Shibasaki |
| 2003/0033214 A1 | 2/2003 | Mikkelsen et al. |
| 2004/0252814 A1 | 12/2004 | Eakin |
| 2006/0008256 A1 | 1/2006 | Khedouri et al. |
| 2007/0174772 A1 | 7/2007 | Gorman |
| 2008/0091606 A1 | 4/2008 | Grecia |
| 2008/0147558 A1 | 6/2008 | Kraus |
| 2009/0049189 A1* | 2/2009 | Zhu et al. ...................... 709/231 |
| 2009/0076881 A1 | 3/2009 | Svendsen |
| 2009/0125527 A1 | 5/2009 | Murata et al. |

(Continued)

*Primary Examiner* — Kyung H Shin

(57) ABSTRACT

Disclosed are system, methods and computer program products for recording, playing back, responding to and sharing audio recordings. In one example embodiment, the system includes an audio management server that stores and distributes through various third-party websites audio clips, such as voice, music, sounds, and other recordings made by system users. The audio clips can be recorded by system users directly through a central website hosted by the server. Alternatively, the audio clips can be recorded on various third-party websites using audio widgets provided by the audio management server. In addition, the recorded audio clips can be shared on various other third-party websites, such as blogs, social networking sites, celebrity sites and the like, using the audio widget provided by the server.

6 Claims, 11 Drawing Sheets

U.S. PATENT DOCUMENTS

| | | |
|---|---|---|
| 2009/0164902 A1* | 6/2009 | Cohen et al. ............... 715/716 |
| 2009/0265617 A1 | 10/2009 | Randall et al. |
| 2009/0286560 A1 | 11/2009 | Willis |
| 2010/0061197 A1 | 3/2010 | Yoshikawa et al. |
| 2010/0063877 A1 | 3/2010 | Soroca et al. |
| 2010/0198944 A1 | 8/2010 | Ho et al. |
| 2010/0257069 A1 | 10/2010 | Levy et al. |
| 2010/0262269 A1 | 10/2010 | Gladwin et al. |
| 2010/0268779 A1* | 10/2010 | Rao ............................. 709/206 |
| 2010/0306859 A1 | 12/2010 | Risan |
| 2011/0026900 A1 | 2/2011 | Lussier et al. |
| 2011/0072350 A1 | 3/2011 | Bachtiger |
| 2011/0078053 A1 | 3/2011 | Pan |
| 2011/0173301 A1 | 7/2011 | Huang et al. |
| 2011/0173523 A1 | 7/2011 | Chasen et al. |
| 2011/0173547 A1 | 7/2011 | Lewis et al. |
| 2011/0231887 A1* | 9/2011 | West et al. ................... 725/116 |

* cited by examiner

SYSTEM AND METHOD FOR MANAGING AND DISTRIBUTING AUDIO RECORDINGS

CROSS-REFERENCE TO RELATED APPLICATIONS

This application is a continuation of U.S. application Ser. No. 13/198,977 filed Aug. 5, 2011, which is incorporated by reference herein in their entirety.

TECHNICAL FIELD

The present invention relates to the field of management and distribution of audio recordings and, in particular, to systems, methods and computer program products for recording, playing back, responding to and sharing audio clips on the Internet.

BACKGROUND

The popularity of the Internet and World Wide Web has spurred the growth in the number of online blogs, chats, social networking sites, celebrity sites and other types of websites that facilitate communication between website visitors. Typically, visitors can post text, graphics and video content, view content posted by other visitors and comment on the content posted on these websites. However, visitors' comments are typically limited to text or simple graphics due to limitations of the current Web technologies. In particular, currently-available systems do not efficiently allow visitors to record audio comments associated with content published on the website, share the recorded audio comments with other website visitors, respond in audio form to the recorded audio comments, and publish the recorded audio comments on other Web platforms, thereby fueling further discourse. Accordingly, there is a need for a new system for management and distribution of audio comments on the Web.

SUMMARY

Disclosed are system, methods and computer program products for recording, playing back, responding to and sharing audio comments or clips on the Internet. In one example embodiment, the system includes an audio management server that stores and distributes audio clips, such as voice, music, sounds, and other recordings made by system users. In one example embodiment, the audio clips can be recorded by system users directly through a central website hosted by the server. In another example embodiment, the audio clips can be recorded on various third-party websites, such as blogs, social networking sites, celebrity sites and the like, using audio web widgets provided by the audio management server. Yet in another embodiment, audio clips can be recorded using an application for a smart phone, tablet computer or other portable electronic device provided by the audio management server.

In one example embodiment, a method for recording, playing back, responding to and sharing audio clips involves the audio server receiving from a first third-party website a request by a website visitor to record an audio clip. The audio management server provides to the first website an audio widget operable to record, play back, respond to and share audio clips. The audio widget records an audio clip from a website visitor, assigns a unique identifier to the recorded audio clip and a unique identifier of the first website, and returns this information to the audio server. The server stores the received information in a database. The server then provides to the audio widget a link to be posted on the first website for accessing the recorded audio clip through the audio widget. If the server receives from the audio widget on the first website a request by the website visitor to share the audio clip on a second third-party website, the server posts on the second website the link or the audio widget for accessing the recorded audio clip through the first website where the audio clip was recorded.

In another example embodiment, a method for recording, playing back, responding to and sharing audio clips comprises the audio management server storing an audio clip recorded on a first third-party website. The server then posts on a second third-party website a link for accessing the audio clip. When the server receives a request by a website visitor to play back the audio clip, the server determines if the playback request came from the first third-party website or the second third-party website. If the request came from the first third-party website where the audio clip was recorded, the server provides to the first third-party website the requested audio clip and an audio widget operable to play back, respond to and share the requested audio clip. If the request came from the second third-party website, the server redirects the website visitor to the first website where the audio clip was recorded for playback of the audio clip on the first website using the audio widget of the first third-party website.

In another example embodiment, a method for recording, playing back, responding to and sharing audio clips comprises the audio management server receiving from a second website a request by a website visitor to play back a first audio clip, which was recorded on a first website and whose link was posted on the second website. The server redirects the visitor to the first website where the audio clip was recorded and provides to the first website the requested first audio clip and an audio widget operable to play back, respond to and share the first audio clip. When the server receives from the first third-party website a request by the website visitor to record a second audio clip in response to the first audio clip, the server instructs the audio widget on the first website to record the second audio clip. The server then posts on the first and second third-party websites links for accessing the first and second audio clip and/or the audio widgets for playing back, responding to and sharing the audio clips.

The above simplified summary of example embodiments serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for recording, playing back, responding to and sharing of audio clips through a plurality of third-party websites. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
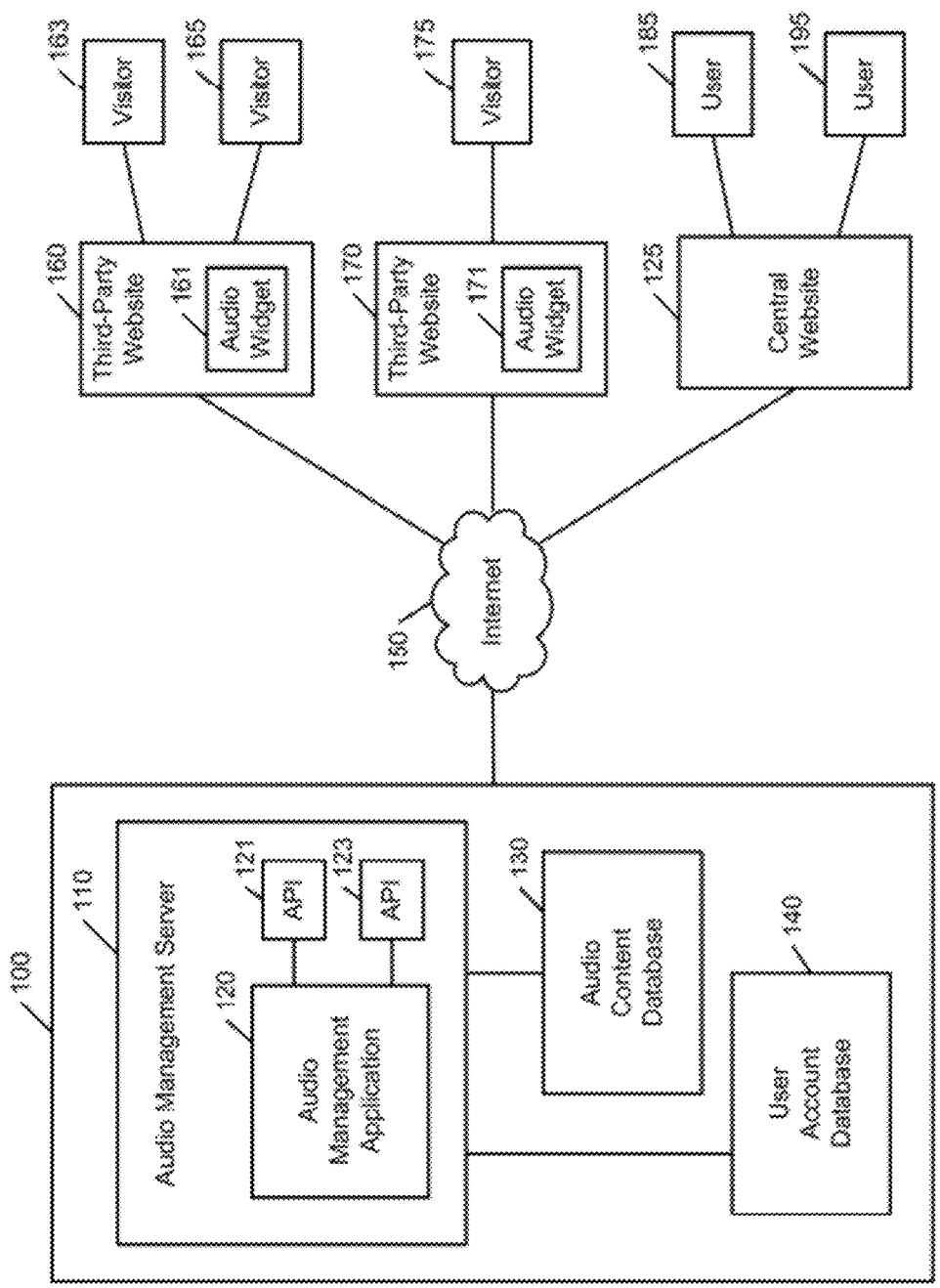
FIG. 1 illustrates a schematic diagram of the audio management system in accordance with one example embodiment.

FIG. 1 illustrates one exemplary embodiment of a system for managing and distributing audio recordings. The system 100 comprises a computer server 110 with an audio management application 120 deployed thereon, an audio content database 130, and a user account database 140. In one embodiment, the system 100 is accessible via the Internet 150 by visitors 163, 165 and 175 of third-party websites 160 and 170, which may interact with the audio management application 120 via application program interfaces (APIs) 121 and 121. A third-party website includes a website owned/operated by an individual or company unaffiliated with owner/operator of system 100, but which may be registered with system 100. In another embodiment, the system 100 may be directly accessed by registered user 185 and 195 through a central website 125 provide by application 120 hosted by the audio management server 110. In one example embodiment, the server 110 may comprise a single server or a group of servers. In another embodiment, the system 100 may employ cloud servers, whereby the number of servers 110 may be scalable and may differ at any given time, depending on the number of users and/or visitors who are utilizing the system 100 at different time points.

In one example embodiment, the audio management application 120 may be implemented as a stand-alone application for use on a portable communication device, such as a smart phone or a tablet computer. In this case, the application 120 will utilize device's wireless or cellular network interface to communicate with the audio management server 110. In this embodiment, the application 120 will include substantially the same functionality as in the embodiments of the web-based application 120 described above. In particular, the application 120 may be configured to perform the functions of recording audio clips on the portable communication device, playback of the recorded audio clips, storage of the audio clips on the server 110, retrieval of audio clips and responses to the audio clips from the server 110, recording of response audio clips, and sharing of audio clips on various third-party websites. Other functionality of the application 120 for portable communication devices may include, but not limited to customization of audio web widgets posted on third-party websites, geo tagging of the recorded audio clips or response audio clips, attachment of photos to the audio clips, etc.

In one example embodiment, an audio management application 120 provides a central website 125, accessible via a Web browser to registered system users 185 and 195. Access to the website 125 may be controlled, so that the user must log in or be otherwise authenticated as being authorized to use the application 120. In one example embodiment, the application 120 allows registered users 185 and 195 to record audio clips, playing back the recorded clips, share the recorded audio clips through various social networking sites, such as Facebook® and Twitter®, email the recorded audio clips to others, listen to audio responses recorded by others, and record responses to the audio clips through the website 125. In other example embodiments, the application 120 also allows registered users 185 and 195 to review statistical information about the number of times the user-recorded audio clips were played back and the source websites from which the audio clips were accessed for playback.

To effectuate the above functions, the audio management system 100 maintains an audio content database 130 and a user account database 140. In one example embodiment, the audio content database 130 stores all recorded audio clips along with a unique identifier of each audio clip and identifier of the source website (e.g., website's URL) where the clip was recorded. The audio clips can be stored in MP3 format or other known digital audio encoding format. In another example embodiment, the audio content database 130 may also stores additional metadata associated with the audio clips including, but not limited to, the descriptive name of the clip, duration of clip, text comments associated with the clip, photos or other images associated with the clip and other metadata. In one example embodiment, the audio content database 130 may also store, for each audio clip, a list of identifiers of related audio clips, e.g., one or more audio clips recorded in response to the original audio clip. In this manner, the server 110 can reconstruct an audio conversation thread between users.

In one example embodiment, the user account database 140 stores a plurality of user accounts of registered users 185 and 195. Each user account may include user's name and logging information. Each user account further contains a list of identifiers of audio clips recorded by the user, identifier of a source website (e.g., website's URL) where each clip was recorded, identifiers of the websites (e.g., websites' URLs) where the audio clips were shared, information about the number of times each audio clip was played back, identifiers of websites from which the audio clips were accessed. The following list is not inclusive and there may be other items of information stored in the user account database 140. For example, the user account may also store user-provided customization data for audio widgets used for recording, playing back, responding to and sharing audio clips on third-party websites 160 and 170, as will be described in a greater detail below. In one example, the non-audio related metadata described above, such as text comments, photos and images, associated with the audio clips may be stored in the user account database 140 instead of the audio content database 130. Yet in another example, the user account may store login information for other websites, such as Facebook® and Twitter®, through which the user may wish to share the recorded audio clips.

As indicated above, the recording, playback, responding to and sharing of audio clips on third-party websites 160 or 170 may be implemented using an audio web widget 161 or 171 provided by the audio management server 110 in accordance with one example embodiment. An audio widget may be implemented as a stand-alone web application or script provided by the serer 110 that can be embedded into third-party websites by a website owner/developer. Alternatively, the audio widget may be provided as a downloadable web application or script implemented using Web technologies, such as JavaScript, Flash, HTML and CSS. In the latter case, the owner of the third-party website 160 may post on its site a link (e.g., an HTML button), which, when activated by a website visitor 163, would instruct the visitor's Web browser to retrieve from the audio management server 110 an audio widget 161 for recording, playback, responding to and sharing of audio clips on the website 160. The audio widget 161 may be activated as a pop-up widget or an inline widget anywhere on the website 160.

Figure 2:
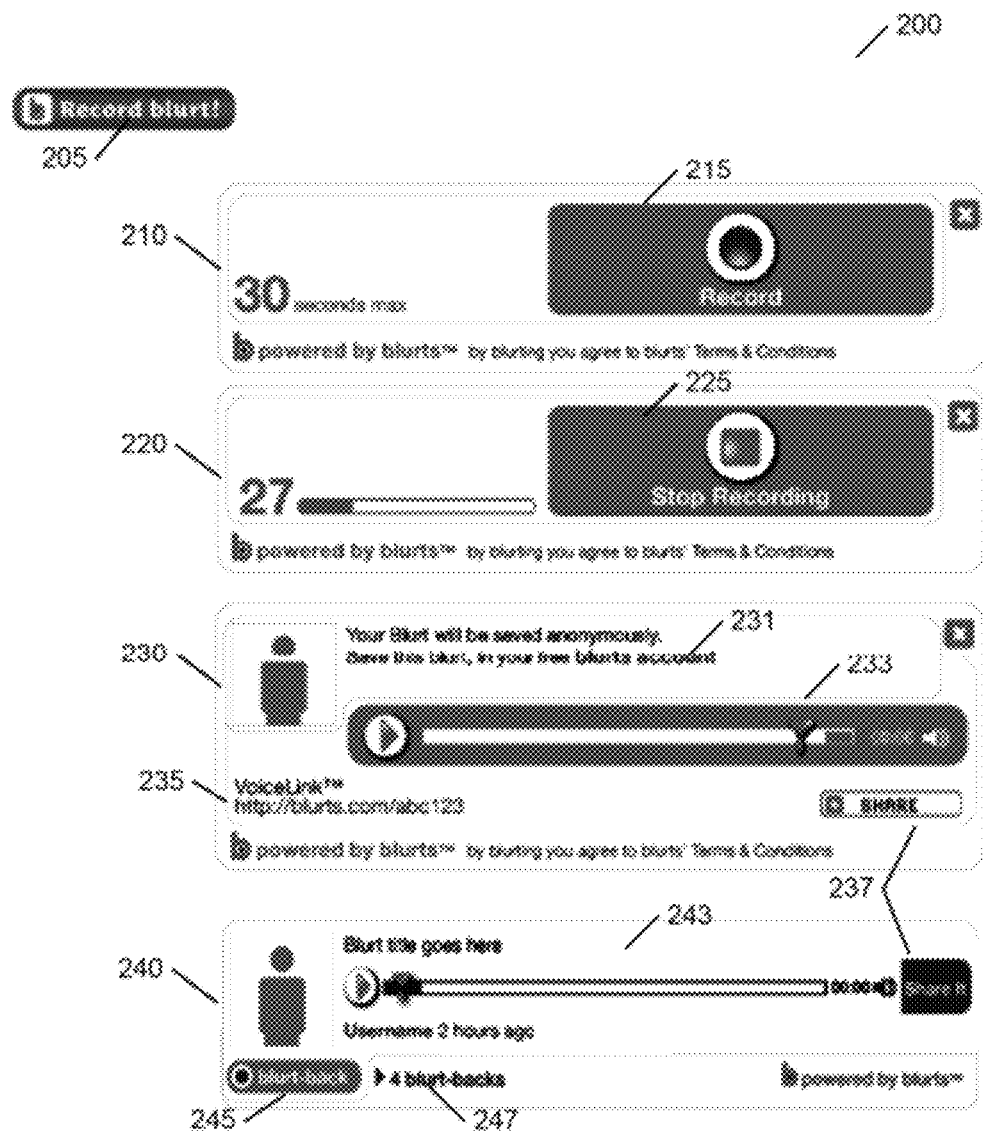
FIG. 2 illustrates one example embodiment of the audio widget.

FIG. 2 depicts one example embodiment of the audio widget provided by the audio management server 110. Audio widget 200 may be downloaded/activated when a website visitor 163 clicks "record blurt" button 205 posted on the third-party website 160. In one example embodiment, the audio widget 200 may have a multi-modular format with each module 210-240 performing one or more different functions. The modules may be closed by the user or automatically when it is no longer needed. Modules 210 and 220 may be used to record a new audio clip. Module 215 provides a record button 215 for recording a new audio clip. The duration of the recording may be limited to 30 seconds or different duration. Pressing of the record button 210 activates Wowza® Media Server or another application capable of recording/playback of streaming audio from the visitor's computer microphone in real-time. The recording may be stopped using stop button 225. The widget 200 may encapsulate the recorded audio clip in a FLV container and transcode it into MP3 format. The widget 200 then uses APIs 121 and 121 to send the audio clip to the server 110 for storage in the database 130.

In one example embodiment, the audio management server 110 assigns a unique identifier to the new audio clip, stores the audio clip in the audio content database 130, and returns to the audio widget 200 a link 235 for accessing the audio clip for playback. The audio clip may be played back using players 233 of module 230. In one example embodiment, the audio clip link 235 may include a URL of the server 130 (e.g., http://blurts.com) and the unique identifier of the audio clip (e.g., abc121). In one example embodiment, the server 110 may automatically post the audio clip link 235 on the website 160, so when the visitor 163 leaves the website 160 and a new visitor 165 subsequently visits the website 160, the audio clip link 235 will be displayed on the website 160. The visitor 165 may play back, respond to and share the audio clip associated with link 235 using module 240 of the embedded audio widget 200. If the audio widget 200 is not embedded on the website 160, it may be loaded by the visitor's Web browser when the visitor 165 clicks on the audio clip link 235 posted on the website 160.

In one example embodiment, the audio widget 200 also allows the website visitor 163 to store the recorded audio clip into his/her account on the audio management server 110. In particular, if the website visitor 163 is a registered user of the audio management application 120, or wishes to become one, the visitor may login into his/her user account, or open a new account, by pressing "account" button 231 of the widget 200 and entering user name and login information. The widget 200 will pass this information through APIs 121 and 121 to the audio management application 120. The application 120 will use the received information to identify visitor's user account in the database 140 and update it with information about newly recorded audio clip. This information may include, but not limited to, the assigned identifier of the audio clip and an identifier of the website 160 where the audio clip was recorded. If the visitor 163 does not register with or have a user account on the server 110, the recorded audio clip may be saved anonymous by the audio management server 110 according to one embodiment.

In another example embodiment, the audio widget 200 also allows visitors to share the recorded audio clips through various Web platforms, such as popular social networking sites, and the like. In particular, when the visitor 163 presses "share" button 237, the audio widget 200 opens a menu of third-party platforms with which the audio clip can be shared. The available Web platforms include, but not limited to: Facebook®, Twitter®, LinkedIn®, MySpace®, Google+®, Flickr® and the like. The visitor 163 may select one or more websites 170 for sharing the audio clip and provide the required website login information. If the visitor 163 is already registered with the server 110, the server will retrieve from the visitor's user account in the database 140 the required login information for the selected website 170. This information may have been previously provided by the user during the registration process. The server 110 will then post on the selected website 170, directly or using a third-party service, the audio clip link 235 for accessing the audio clip from the audio management server 110.

Once the audio clip link 235 is posted on another website 170, such as Facebook®, Twitter® or other social networking site, the system 100 allows a visitor 175 of the website 170 to play back, respond to and further share the audio clip. In particular, when the visitor 175 clicks on the audio clip link 235 posted on the website 170, the visitors' Web browser sends an HTML request to the audio management server 110 to retrieve the audio clip associated with the link. In response, the server 110 retrieves a unique identifier of the audio clip from the link 235 and uses it to identify the associate audio clip. The server 110 also compares an identifier of the website from which the request for the audio clip came from with the identifier of the website where the audio clip was recorded, which is stored in the audio content database 130. In the given example, the audio clip was recorded on website 160 and the request for the audio clip came from website 170. Therefore, server 110 will determine that two website identifiers are different. When the two website identifiers are different, the server 110 is configured to redirect the visitor's Web browser to the website 160 wherein the clip was recorded. Once on the website 160, the server 110 activates the audio widget 200, which in turn loads the requested audio clip for playback using player 243 of the module 240 to the visitor 175.

In one example embodiment, the audio widget 200 also allows website visitor 175 (or visitor 165) to record their own second audio clip in response to the first audio clip recorded by visitor 163. In particular, once the visitor 175 listened to the first audio clip using module 240 of the audio widget 200, the visitor may press "blurt-back" button 245, which activates modules 210 and 220 for recording and storing a second audio clip. Functionality of these modules has been described above. Once the second audio clip is recorded and stored by the by the audio content database 130, a registered visitor 175 may store the recorded audio clip into his/her account on the audio management server 110, as described above. In addition, the server 100 associates the identifier of the second audio clip with the identifier of the second audio clip in the database 130 to indicate that the second audio clip relates to the first audio clip, whereby reconstructing an audio conversation thread among multiple system users.

Yet in another example embodiment, the visitor 175 or any other visitor of the website 160 may view and play back the entire audio conversation thread comprising multiple audio clips recorded by various visitors of website 160 or other websites where the audio clip was shared. In particular, the visitor 175 can press "blurt-backs" button 247 of the module 240 of the audio widget 200 in response to which the widget retrieves from the server 100 information about all audio clips related to (e.g., recorded in response to) the first audio clip or any other clip in the audio conversation thread. The audio widget 200 may than generate a copy of module 240 for each related audio clip in the given audio conversation thread. For each audio clip, the module 240 may indicated the name of the user who recorded the clip (or anonymous user if the audio clip was recorded by an unregistered visitor), the date and time when the audio clip was recorded, and an identifier of the website where the clip was recorded or from which the visitor who recorded the clip was redirected from. The visitor 175 may then play back each audio clip one at a time using player 243 of the module 240 of the widget 200.

Yet in another embodiment, the visitor 175 may share any one of the related audio clips through various Web platforms, such as popular social networking sites and the like. In particular, the visitor 175 may press "share" button 237 in the module 240 and the audio widget 200 will opens a menu of third-party Web platforms on which the audio clip can be shared. As indicated above, the available Web platforms include, but not limited to: Facebook®, Twitter®, LinkedIn®, MySpace®, Google+®, Flickr® and others. The visitor 175 may then select one or more websites 170 for sharing the audio clip and provide the required website login information. The server 110 will then post an audio clip link 235 on the selected website 170. In this manner, by sharing links to the first audio clip recorded on website 160 to other websites, the visitor traffic from those websites is driven to the website 160, where through multiple audio responses to the first audio clip, a single audio clip grows into an audio conversation thread consisting of numerous audio clips recorded by different visitors.

Figure 3:
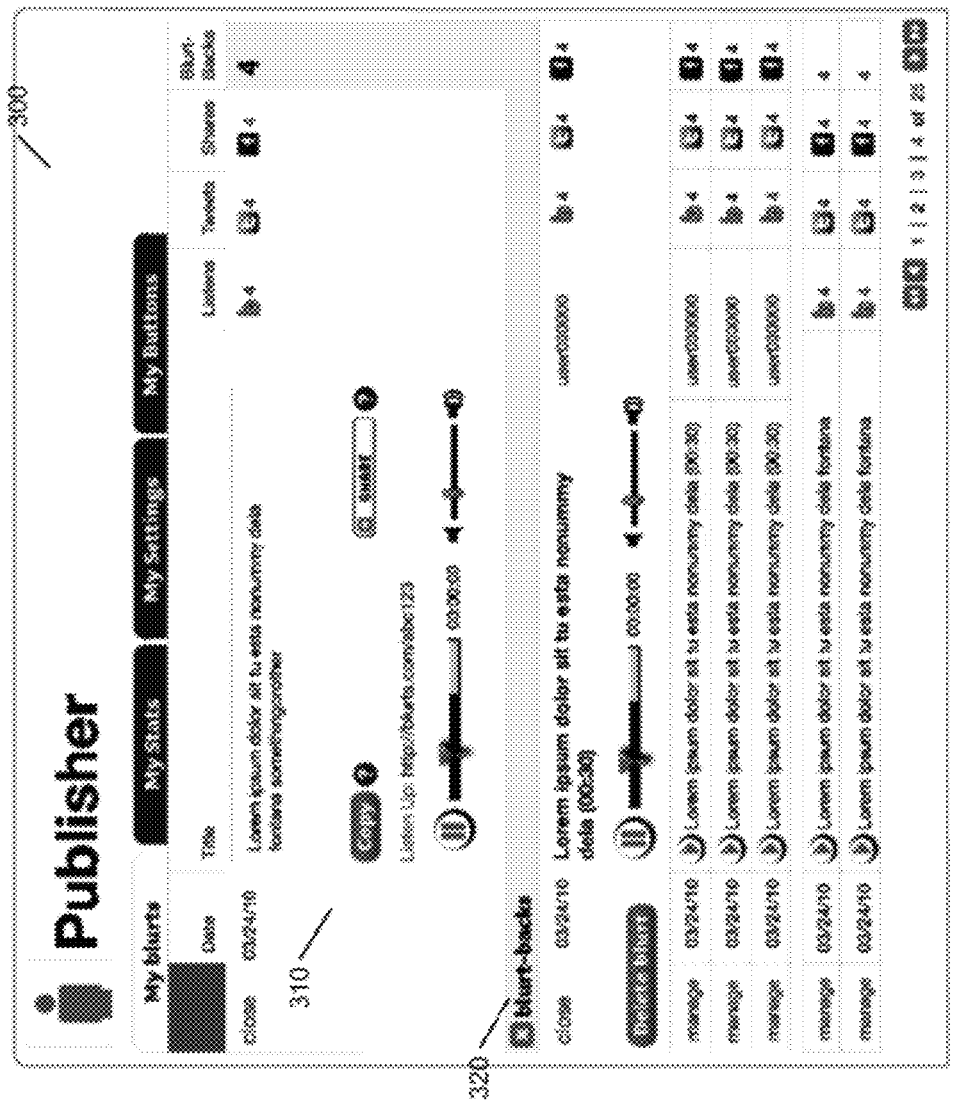
FIG. 3 illustrates an exemplary interface of the audio management application.

As mentioned above, the information about audio conversation threads is collected by the audio management application 120 and stored in the accounts of registered users. This information may be accessed by a registered system user through the central website 125 provided by the application 120. FIG. 3 depicts an exemplary user account interface of the central website 125. The interface 300 includes information about each audio conversation thread initiated by the user of said account. Section 310 shows the original audio clip recorded by the user and various associated metadata, such as title, time and date of recoding, audio clip link, duration of the clip, and the number of times the clip was shared and where. Section 320 shows a list of audio responses associated with the original audio clip as well as various information about the audio response, including but not limited to the title of each clip, time and date of recoding, audio clip link, duration of the clip, the number of times the clip was shared and where, and the names of users who recorded the response clips.

Figure 4:
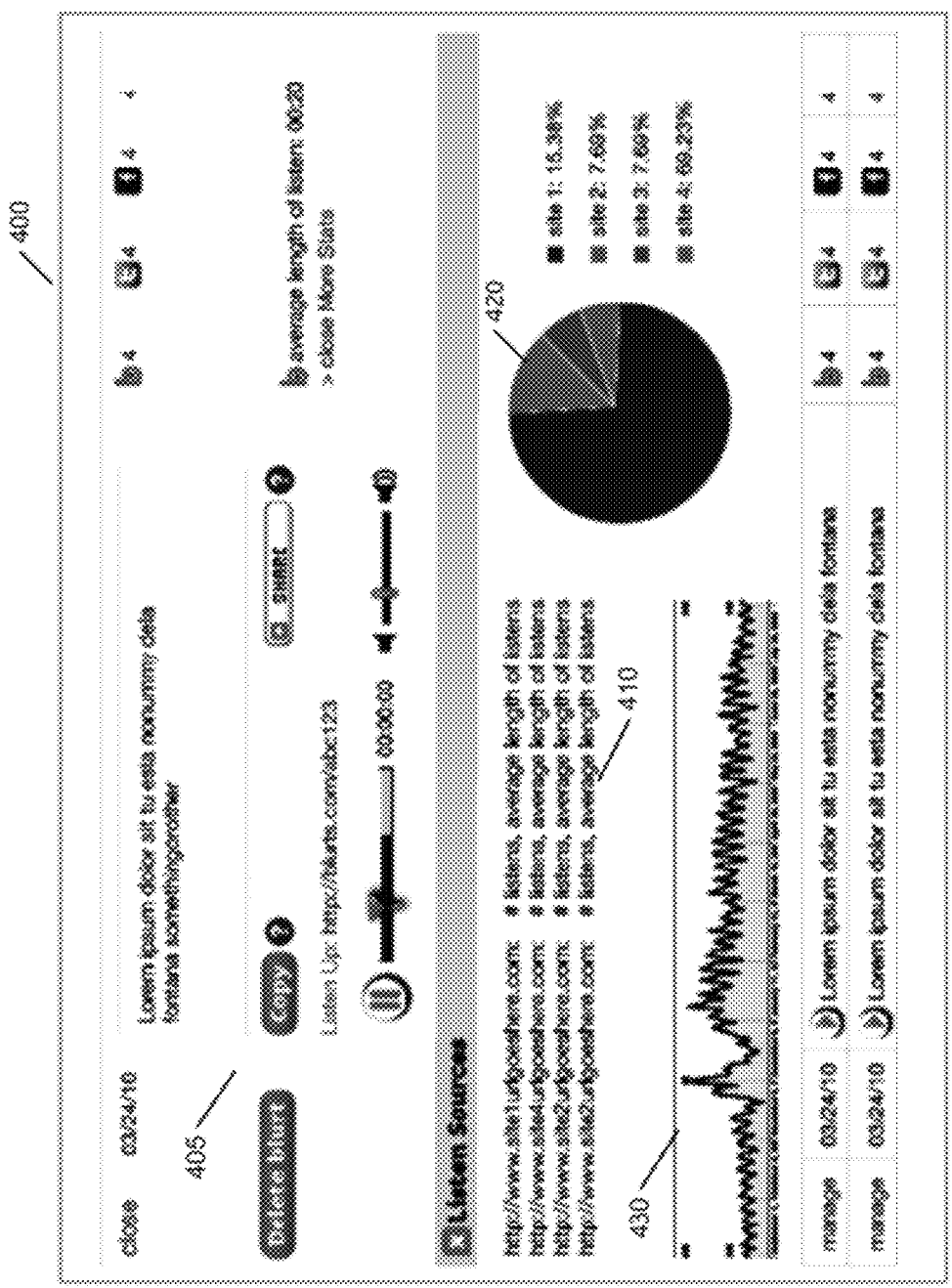
FIG. 4 illustrates another exemplary interface of the audio management application.

FIG. 4 depicts another exemplary user account interface of the central website 125 provided by of the application 120. This interface 400 shows statistical information about audio clip 405 and associated audio conversation thread. For example, section 410 shows a list of listening sources, i.e., the URLs of websites where audio clip 405 was played back or was redirected for playback from. Pie chart 420 shows the number of times that audio clip 405 was played back. Time chart 430 tracks the number of listens of clip 405 over time. The collected statistical information is not limited to the above-described and may include other types of information about audio clips and the associated audio conversation thread. In addition, other graphical or numerical forms may be used to represent the collected statistical data.

In one example embodiment, the audio management server 110 may perform a speech-to-text conversion of the stored audio clips for data mining or other purposes. For example, the server 110 may analyze the text of an individual audio clips or the entire audio conversation thread to determine its subject matter. This information may be used to determine interests and views of the user who recorded the original clip as well as to identify other users who contributed to the audio conversation thread, and therefore share similar interests or views. In addition, this information may be used to monetize the audio management system by inserting contextual ads into the audio widget 200 when it plays back a particular audio clip. Thus, for example, if an audio conversation thread published on website 160 discusses a new model of a gaming console, and the audio conversation thread between several website visitors indicates that these visitors are interested in purchasing the discussed gaming console, the audio management server 110 may insert an advertisement of a major consumer electronics retailer with a discount or sale offer on the discussed gaming console.

Yet in one example embodiment, the users of the audio management system 100 may monetize their audio clips by charging listeners for each playback of the audio clip. For example, a celebrity person may register with the audio management system 100 and record using the central website 125 a short statement, announcement or message to his/her fans, and share the recorded audio clip on his/her Facebook® or Twitter® webpage. The server 110 would allow the celebrity to assign a monetary value (e.g., $0.10) for each listen of the audio clip. The audio widget 200 and server 110 may be configured to use PayPal® or other online money transfer system to collect payments from listeners and transfer the money to the celebrity's account. If the celebrity has a large number of Facebook or Twitter followers, the celebrity may collect substantial amount of money from the fans who listened to his/her audio clips. In another example embodiment, the celebrity may embed the audio widget 200 on his personal website, record the audio clips on his personal website, and post the clips on his/her Facebook® or Twitter® webpages. When the fans will click on the audio clip link, they will be redirected to celebrity's personal website, thereby driving visitor traffic to celebrity's website.

Figure 5A:
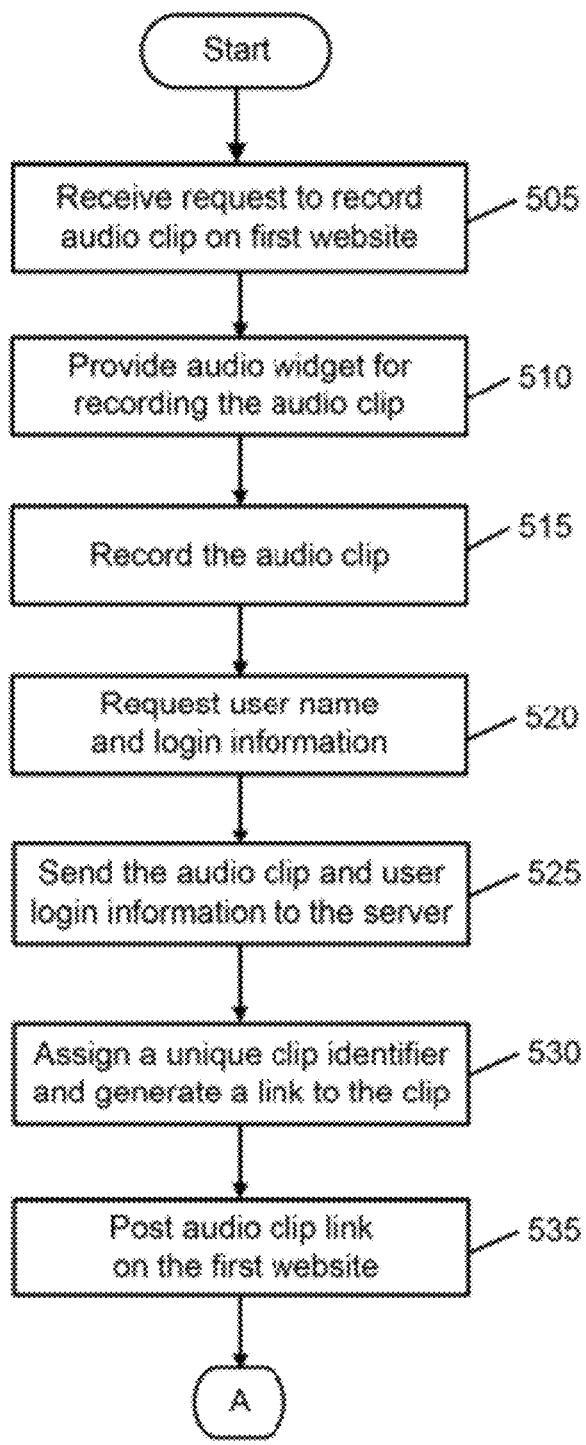
FIGS. 5A and B illustrate a flow chart of a method of operation of the audio management system in accordance with one example embodiment.
Figure 5B:
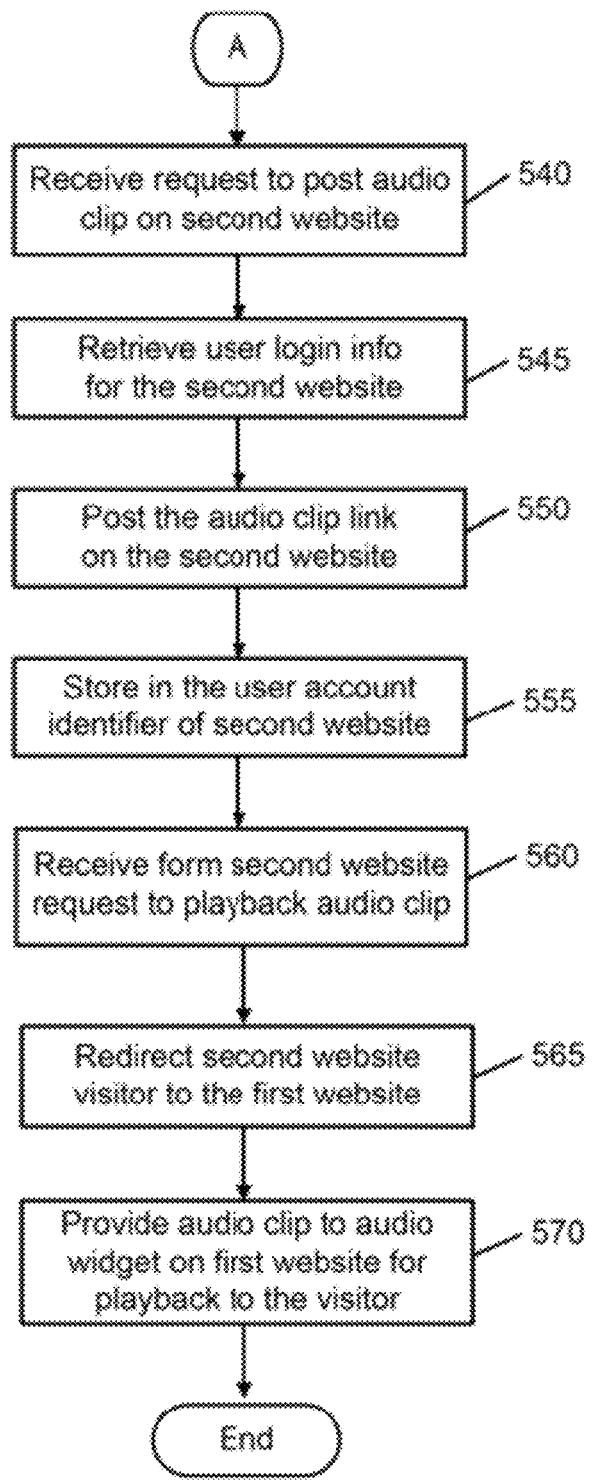

FIGS. 5A and B depict a flow chart of a method of operation of the audio management system in accordance with one example embodiment. At step 505, the audio management server receives from a first website a request by a first website visitor to record an audio clip on the first website. At step 510, the server provides to the first website an audio widget operable to record, play back, respond to and share audio clips. At step 515, the audio widget records an audio clip from the first website visitor. At step 520, the widget requests the visitor to provide login information for the user account on the server. At step 525, the audio widget sends the recorded audio clip and visitor's log information to the server. At step 530, the server receives the audio clip, assigns a unique identifier to the audio clip, stores the audio clip in the audio content database, and generates a link to the audio clip. In one example embodiment, the link comprises an identifier of the audio server and unique identifier of the audio clip. The server also access user account using the provided login information, and stores the audio clip identifier and a first website identifier in the user account. If the visitor did not provide account login information, the audio clip may be stored unanimously.

At step 535, the server provides to the audio widget an audio clip link to be posted on the first website for accessing the audio clip through the audio widget. At step 540, the server receives from the audio widget on the first website a request by the first website visitor to share the recorded audio clip on a second website. At step 545, the server retrieves from the user account login information for the second website or requests the first website visitor to provide the required login information. At step 550, the server posts on the second website the audio clip link or the audio widget for recording, playback, responding to and sharing of the audio clip. At step 555, the server stores in the user account an identifier of the second website where the audio clip was posted. At step 560, the server receives from the second website a request by a second website visitor to play back the audio clip whose link is posted on the second website. At step 565, the server redirects the visitor to the first website where the audio clip was recorded. At step 570, the server provides the requested audio clip to the audio widget on the first website for playback of the clip to the second website visitor.

Figure 6A:
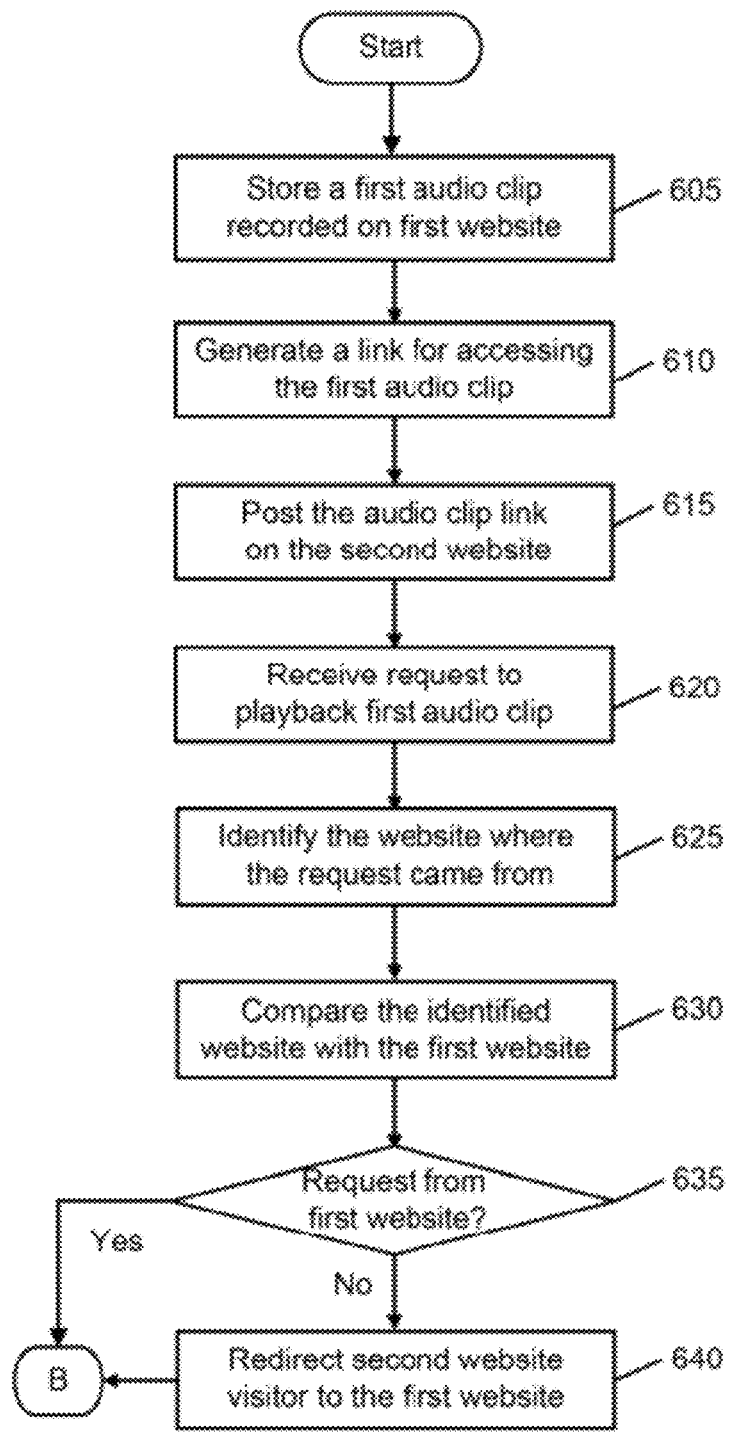
FIGS. 6A and B illustrate a flow chart of another method of operation of the audio management system in accordance with another example embodiment.
Figure 6B:
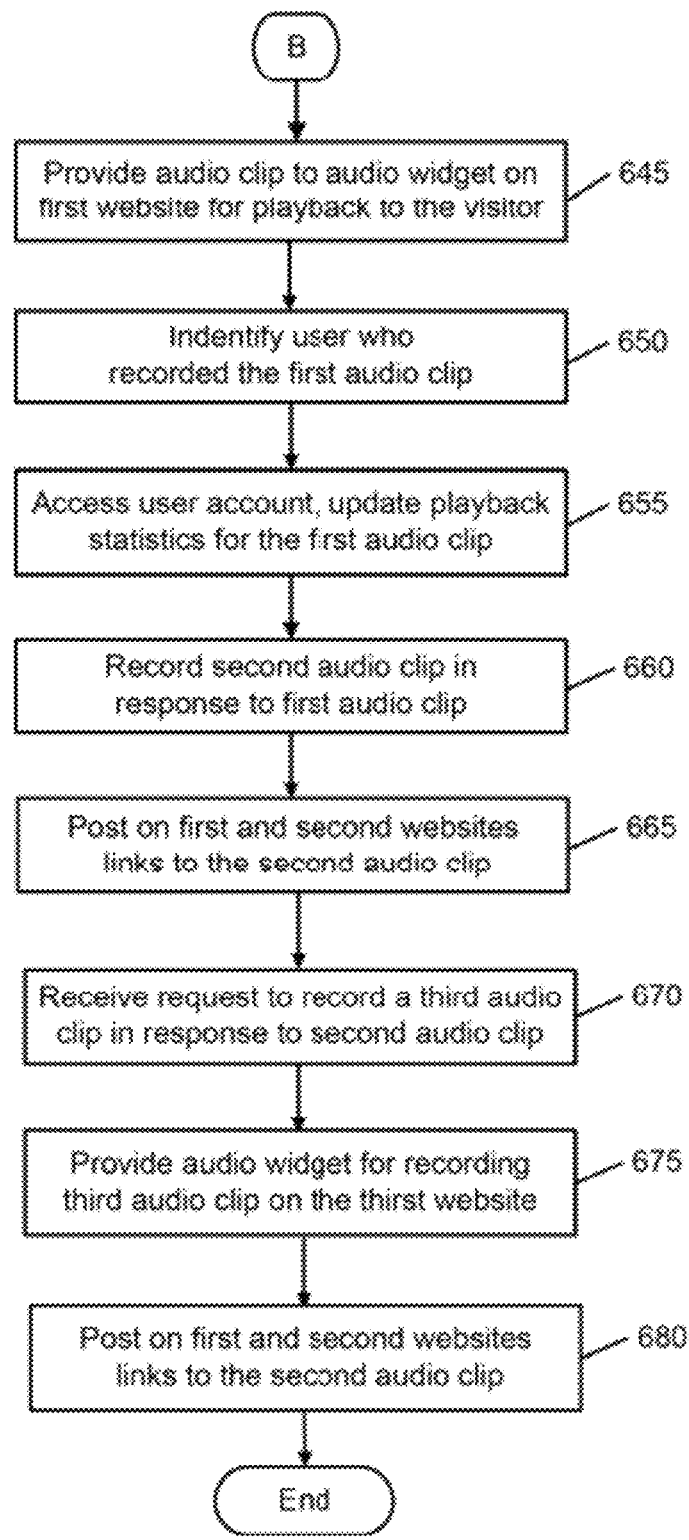

FIGS. 6A and B depict a flow chart of another method of operation of the audio management system in accordance with another example embodiment. At step 605, the audio management server stores a first audio clip recorded on a first website. At step 610, the server generates a link for accessing the first audio clip from the audio server. At step 615, the server posts on the second website the audio clip link for accessing the first audio clip. At step 620, the server receives a request by a website visitor to play back the first audio clip. At step 625, the server determines from the request an identifier of the website where the request came from. At step 630, the server compares the website identifier with the first website wherein the clip was recorded. At step 635, the server determines if the playback request came from the first website or the second website. If the request came from the second website, at step 640, the server redirects the website visitor to the first website where the first audio clip was recorded for playback of the first audio clip on the first website. If the request came from the first website or the visitor has been just redirected to the first website, at step 645, the server provides to the first website the first audio clip and an audio widget that enables the visitor to play back, respond to and share the first audio clip on the first website.

At step 650, after the playback of the first audio clip on the first website, the server identifies a user of the audio server who recorded the first audio clip. At step 655, the server accesses the user account, updates a playback counter associated with the first audio clip, and stores an identifier of the second website in the user account. At step 660, the server receives from the website visitor a request to record a second audio clip in response to the first audio clip recorded on the first website and instructs the audio widget on the first website to record the second audio clip. At step 665, the server posts on the first and second websites audio clip links for accessing the second audio clip. At step 670, the server receives from the website visitor a request to record a third audio clip in response to the second audio clip recorded on the first website. At step 675, the server provides audio widget for recording the third audio clip of the first website. At step 680, the server posts on the first and second websites audio clip links for accessing the third audio clip recorded on the first website.

Figure 7A:
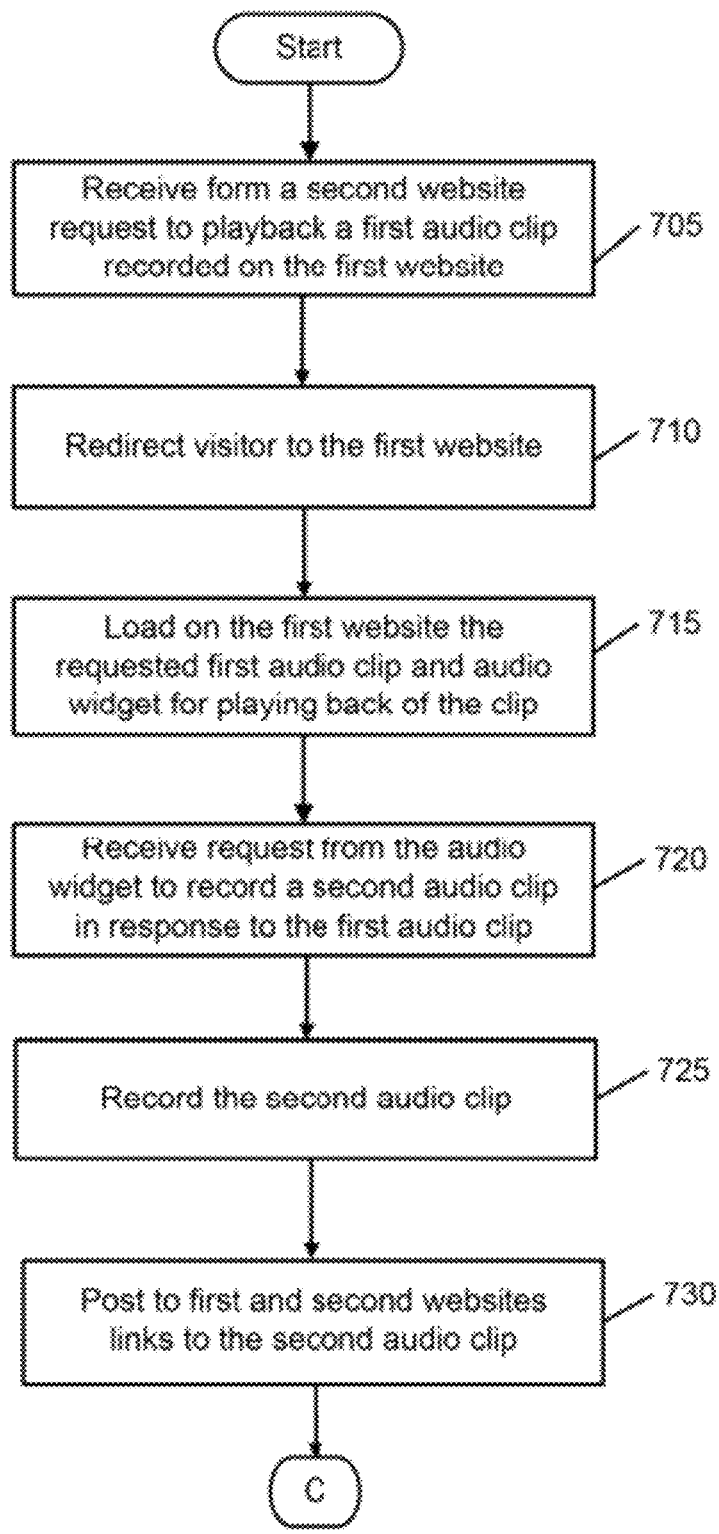
FIGS. 7A and B illustrate a flow chart of yet another method of operation of the audio management system in accordance with another example embodiment.
Figure 7B:
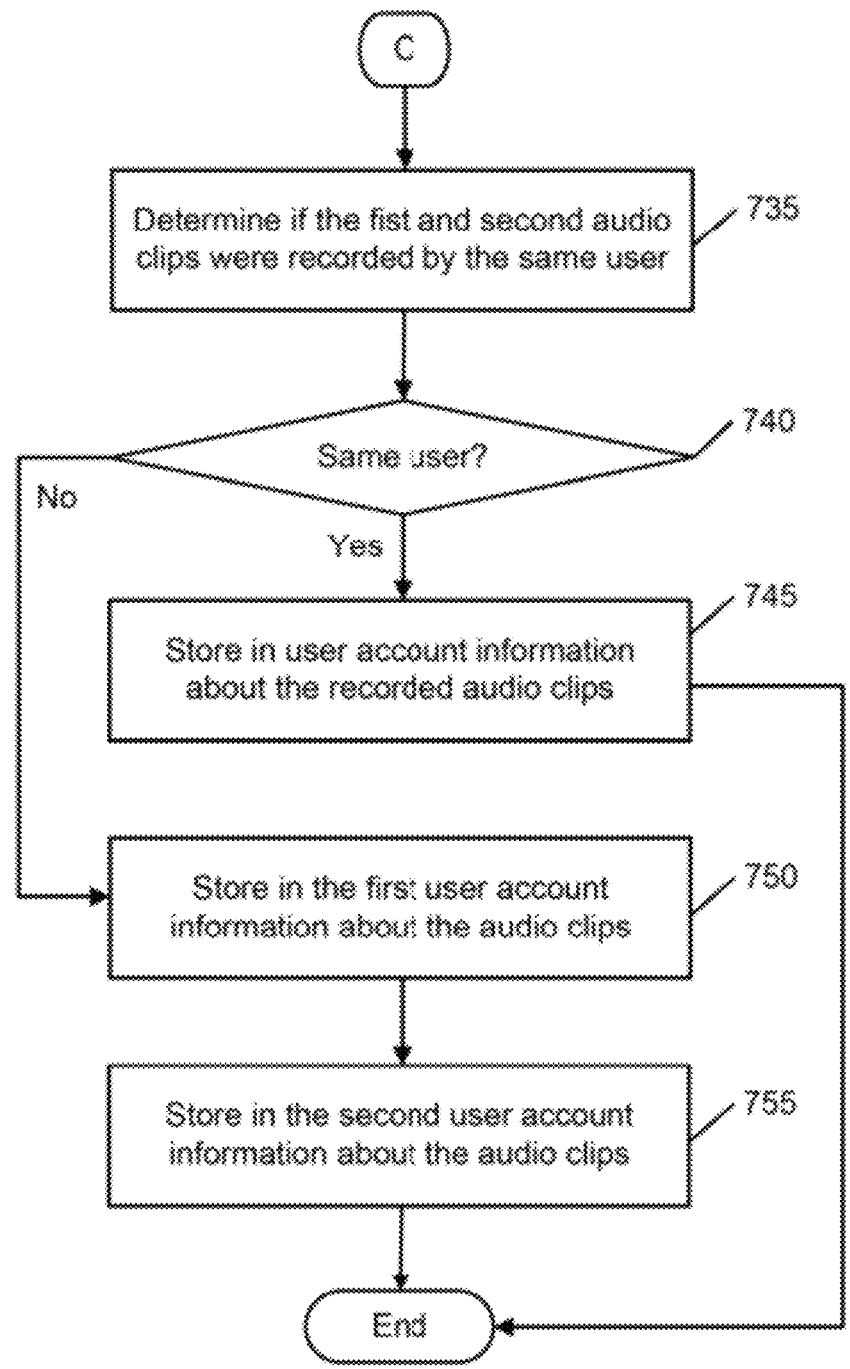

FIGS. 7A and B depict a flow chart of yet another method of operation of the audio management system in accordance with another example embodiment. At step 705, the audio management server receives from a second website a request by a website visitor to play back a first audio clip, which was recorded on a first website and whose link was posted on the second website. At step 710, the server redirects the visitor to the first website where the audio clip was recorded. At step 715, the server provides to the first website the requested first audio clip and an audio widget operable to play back, respond to and share the first audio clip. At step 720, the server receives from the first website a request by a website visitor to record a second audio clip in response to the first audio clip. At step 725, the audio widget on the first website records the second audio clip. At step 730, the server posts on the first and second websites audio clip links for accessing the first and second audio clips or the audio widgets for playing back, responding to and sharing the first and second audio clips.

At step 735, the server determines whether the first and second audio clips were recorded by the same or different website visitors. If it is determined at step 740 that the clips were recorded by the same visitor, at step 745, the server stores in the user account of said visitor the identifier of the first audio clip and an identifier of the first website, the identifier of the second audio clip and an identifier of the second website, and the indicator that the second audio clip was recorded in response to the first audio clip. If the first and second audio clips were recorded by different visitors, at step 750, the server stores in the user account of the first website visitor who recorded the first audio clip the identifier of the first audio clip, an identifier of the first website, the identifier of the second audio clip, and the indicator that the second audio clip was recorded in response to the first audio clip. At step 755, the server stores in the user account of the second website visitor who recorded the second audio clip the identifier of the second audio clip, an identifier of the second website, the identifier of the first audio clip, and the indicator that the second audio clip was recorded in response to the first audio clip.

Figure 8:
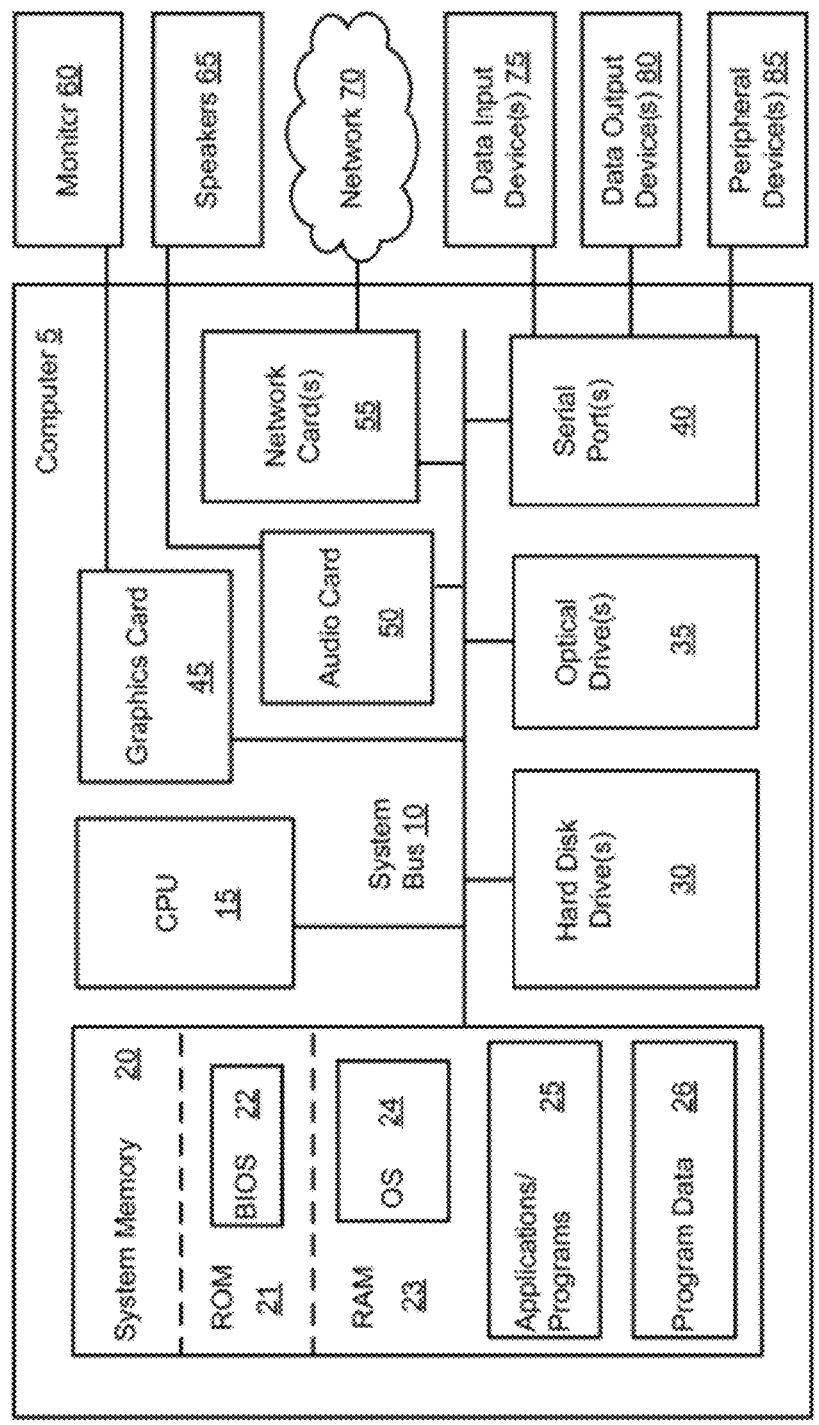
FIG. 8 illustrates a schematic diagram of a computer system in accordance with one example embodiment.

FIG. 8 depicts one example embodiment of a computer system 5, which could be used to implement the audio management server 110 of the audio management system 100. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25, such as services 306. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are disclosed. It will be appreciated that in the development of any actual implementation of the invention, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for recording, playing back, responding to and sharing audio clips comprising:
   storing in an audio server a first audio clip recorded on a first third-party website;
   posting on a second third-party website a link for accessing the first audio clip;
   receiving a request from a website visitor to play back the first audio clip, wherein the request includes a link to the first audio clip on the audio server;
   determining if the playback request came from the first or second third-party website;
   if the playback request came from the first third-party website where the first audio clip was recorded, providing to the first third-party website the first audio clip and an audio widget operable to play back, respond to and share the first audio clip; and
   if the playback request came from the second third-party website, redirecting the website visitor to the first third-party website and providing to the first third-party website the first audio clip and the audio widget operable to play back, respond to and share the audio clip.

2. The method of claim 1, wherein storing in an audio server a first audio clip further comprises:
   assigning by the audio server a unique identifier to the first audio clip; and
   generating by the audio server a link to the first audio clip, the link comprising an identifier of the audio server and the unique identifier of the first audio clip.

3. The method of claim 1, wherein determining if the playback request came from the first or second third-party website further comprises:
   determining from the playback request a website which sent the playback request; and
   comparing said website with the first website where the first audio clip was recorded.

4. The method of claim 1, wherein, after the playback of the audio clip on the first website,
   identifying a user of the audio server who recorded the first audio clip;
   accessing a user account of the identified user in the audio server;
   updating in the user account a playback counter associated with the first audio clip; and
   if the playback request came from the second third-party website, storing in the user account an identifier of the second third-party website.

5. The method of claim 1 further comprising:
   receiving from the website visitor a request to record a second audio clip in response to the first audio clip recorded on the first third-party website;
   recording the second audio clip using the audio player widget of the first website; and
   posting on the first and second third-party websites links to the second audio clip.

6. The method of claim 5 further comprising:
receiving from the website visitor a request to record a third audio clip in response to the second clip recorded on the first third-party website;
recording the third audio clip using the audio widget of the first website; and
posting on the first and second third-party websites links to the third audio clip.

\* \* \* \* \*